United States Patent
Fernando

(10) Patent No.: US 9,342,369 B2
(45) Date of Patent: May 17, 2016

(54) SYSTEM AND METHOD FOR INCREASING THROUGHPUT OF A PAAS SYSTEM

(71) Applicant: Wal-Mart Stores, Inc., Bentonville, AR (US)

(72) Inventor: Ashwanth Fernando, Foster City, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 269 days.

(21) Appl. No.: 13/735,896

(22) Filed: Jan. 7, 2013

(65) Prior Publication Data

US 2014/0196044 A1 Jul. 10, 2014

(51) Int. Cl.
G06F 9/46 (2006.01)
G06F 9/50 (2006.01)

(52) U.S. Cl.
CPC ............ *G06F 9/5072* (2013.01); *G06F 9/5027* (2013.01); *G06F 2209/5018* (2013.01)

(58) Field of Classification Search
CPC ... G06F 9/5055; G06F 9/5066; G06F 9/5083; G06F 2009/4557; G06F 8/61; G06F 8/60; G06F 9/5072; G06F 9/5027; G06F 2209/5018
See application file for complete search history.

(56) References Cited

U.S. PATENT DOCUMENTS

| | | | | |
|---|---|---|---|---|
| 7,082,604 | B2 * | 7/2006 | Schneiderman | 718/100 |
| 2009/0112566 | A1 * | 4/2009 | Chancey et al. | 703/22 |
| 2010/0186020 | A1 * | 7/2010 | Maddhirala et al. | 718/105 |
| 2011/0161976 | A1 * | 6/2011 | Alexander et al. | 718/104 |
| 2011/0252428 | A1 * | 10/2011 | Maruyama | 718/103 |
| 2013/0179895 | A1 * | 7/2013 | Calder et al. | 718/104 |
| 2013/0227558 | A1 * | 8/2013 | Du et al. | 718/1 |
| 2014/0007121 | A1 * | 1/2014 | Caufield et al. | 718/103 |

* cited by examiner

*Primary Examiner* — Lewis A Bullock, Jr.
*Assistant Examiner* — Jacob Dascomb
(74) *Attorney, Agent, or Firm* — Bryan Cave LLP

(57) ABSTRACT

Systems and methods are disclosed for managing the throughput of a platform as a service (PaaS) system. A plurality of PaaS nodes receives deployment jobs, such as from an interface by way of a load balancer. The PaaS nodes extract deployment actions and an action count and post the deployment actions to a queue. The PaaS nodes also initiate, in a coordinator, a counter for the deployment job. The PaaS nodes retrieve deployment actions from the queue and execute them, such as in one of a plurality of threads in a flexible thread pool. Upon completing the action, the PaaS nodes report update the counter corresponding to the deployment job of the action. When a counter for a deployment jobs reaches the action count for the job, completion is reported.

14 Claims, 8 Drawing Sheets

SYSTEM AND METHOD FOR INCREASING THROUGHPUT OF A PAAS SYSTEM

BACKGROUND

1. Field of the Invention

This invention relates to systems and methods for managing an application installation and associated resources.

2. Background of the Invention

Today's applications are very complex both in terms of actual functionality and in the number of components that must interact in order to provide a computing service. In particular, applications often require various external resources to facilitate their operation. Often, these resources are standardized software modules or systems such as databases, web servers, and the like. The deployment of applications has recently been facilitated by using commoditized services such as a "Platform as a Service" (PaaS) that provides the capability to provision or modify the different resources of a computing platform on demand, such as an operating system, virtual machine, database, web server, file system, storage and network resources, or any other application or resource. Typically the PaaS also interacts with an infrastructure as a service (IaaS) component to provision virtual machines (or computing power) before the software can be deployed.

The following detailed description provides scalable and improved systems and methods for providing PaaS and associated functionality, particularly for extremely large deployments.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
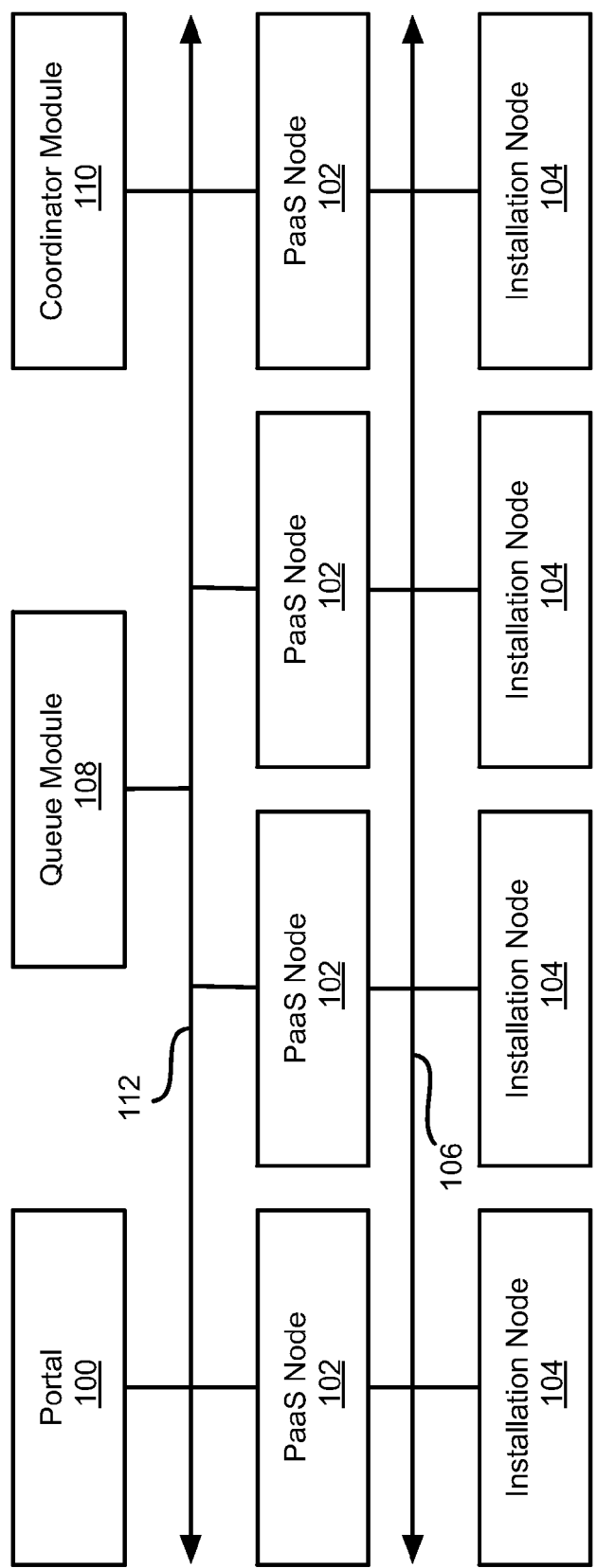
FIG. 1 is a schematic block diagram of an environment for implementing a platform as a service (PaaS) management methods in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates components of a computing environment in which the methods described hereinbelow may be implemented. For example, a portal 100 may receive deployment jobs for execution by any of a plurality of platform as a service (PaaS) nodes 102. The portal 100 may, for example, receive deployment jobs from an interface executing elsewhere or interfaces executing on a plurality of client computers. The portal 100 may receive deployment jobs from a load balancer that distributes deployment jobs to the PaaS nodes 102 according to any load balancing algorithm, including simple random or round robin assignment or more sophisticated algorithms. Alternatively, the portal 100 may implement such as load balancer. The PaaS nodes 102 may be executed on separate computing devices or a single computing device may host multiple PaaS node 102 instances.

As known in the art PaaS provides "cloud computing" resources including a computing platform (e.g., hardware, operating system, and/or virtual machine) as well as one or more software resources needed to provide a service. Software resources may include, for example, databases, web servers, messaging service, a compiler, a scripting language interpreter, an execution container, a load balancer, a Java™ servlet container, a nodes package manager, configuration resources, a storage service, or other resource.

The PaaS nodes 102 may be operable to deploy and configure some or all of these resources as well as take actions in order to start, stop, or modify the operation of any of these resources or upgrade or otherwise modify these resources. Actions may include upgrade requests, start requests, stop requests, traffic enable requests, traffic disable requests, provisioning requests, installation requests, load balancer binding requests, database provisioning requests, database edit requests, or other actions. The deployment and other types of actions may be taken with respect to one or more installation nodes 104. The installation nodes 104 may each be a separate computing devices or a single computing device may have multiple instances of installation nodes 104 executing thereon. The installation nodes 104 typically include different computing devices than those executing the PaaS nodes 102, but may execute on the same devices in some embodiments. The PaaS nodes 102 may be in data communication with one another and with the installation nodes 104 by a network 106, such as a local area network (LAN), wide area network (WAN), virtual private network (VPN), the Internet, or some other network.

The PaaS nodes may additionally be in data communication with a queue module 108 and coordinator module 110, such as by means of a different network 112 or the same network 106. The operation of the coordinator module 110 will be described in greater detail below. The queue module 108 implements a first in first out (FIFO) buffer, the use of which in the context of embodiments of the invention is also described in greater detail below. The queue module 108 and coordinator module 110 may be executed on a same computing device as one or more of the PaaS nodes 102 or one or more other computing devices.

Figure 2:
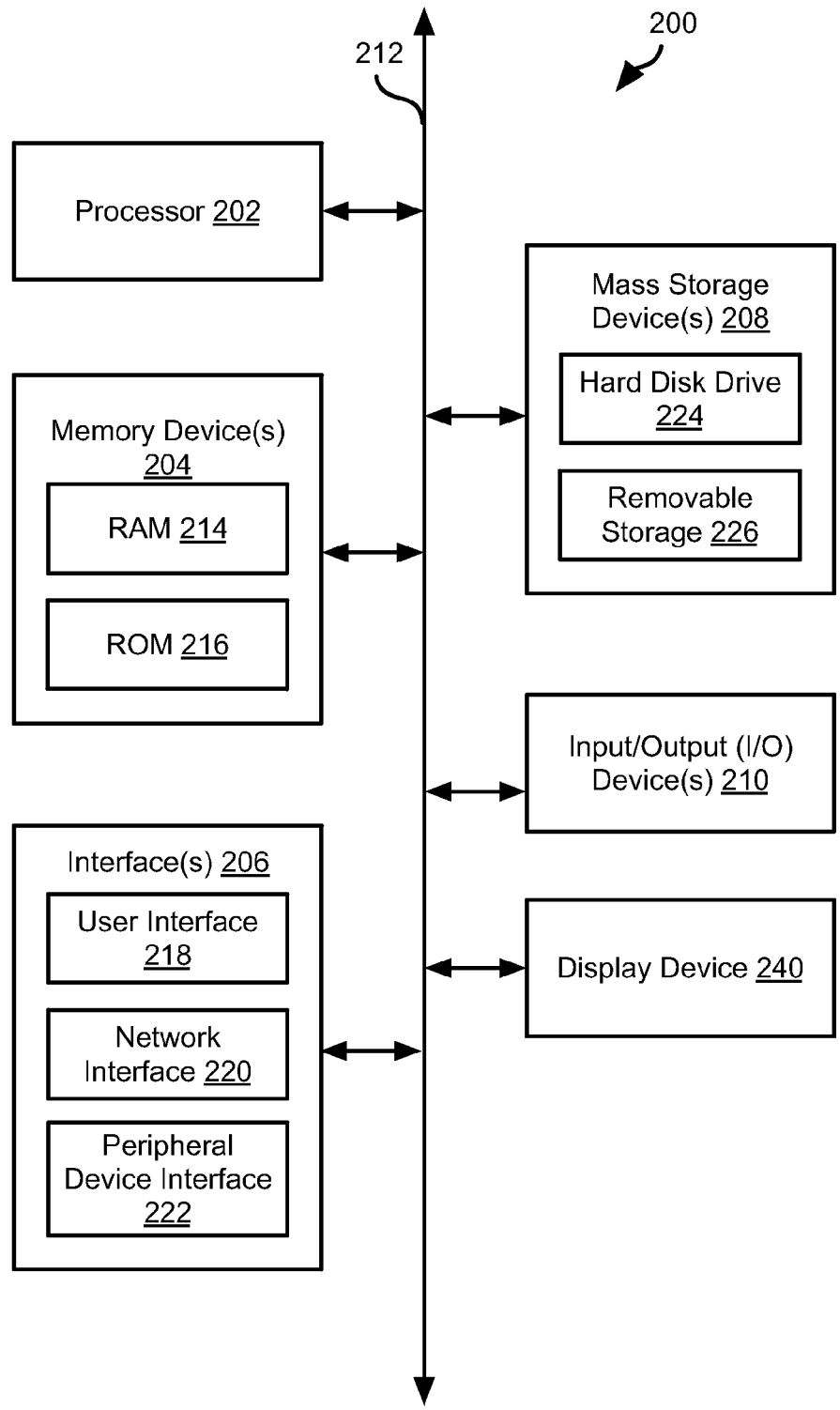
FIG. 2 is a block diagram of a computing device suitable for implementing embodiments of the present invention.

FIG. 2 is a block diagram illustrating an example computing device 200. Computing device 200 may be used to perform various procedures, such as those discussed herein. In particular, a installation node 104 or a computing device implementing a PaaS node 102, queue module 108, or coordinator module 110 may be include some or all of the components of the illustrated computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
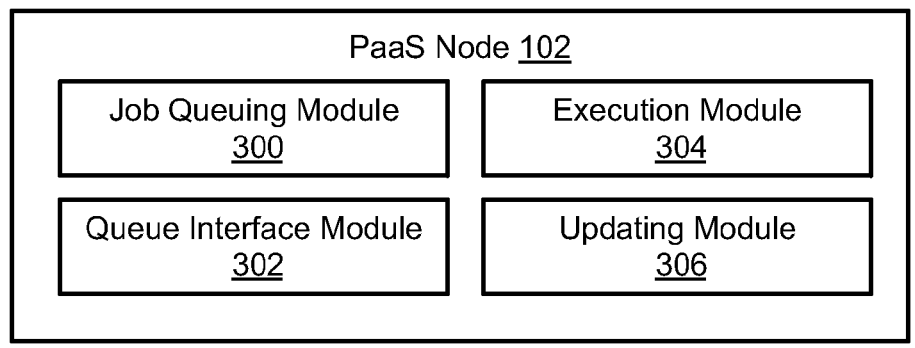
FIG. 3 is a schematic block diagram of a PaaS node accordance with an embodiment of the present invention.

FIG. 3 is a block diagram of a PaaS node 102. A PaaS node 102 may include a job queuing module 300, a queue interface module 302, an execution module 304, and an updating module 306.

The job queuing module 300 receives a deployment job that includes a plurality of deployment actions, including the installation, modification, removal, or other action with respect to one or more of the resources identified above on one or more installation nodes 104. The actions taken may include consuming an application manifest such as disclosed in U.S. application Ser. No. 13/631,177 entitled SYSTEMS AND METHODS FOR INSTALLING, MANAGING, AND PROVISIONING APPLICATIONS, filed Sep. 28, 2012, which is hereby incorporated herein by reference in its entirety for all purposes. In a like manner, the deployment jobs may be invoked in accordance with execution of an application manifest The job queuing module 300 extracts these actions and posts them to a queue, such as a FIFO queue implemented by a queue module 108. The deployment job may have an identifier associated with it upon receipt by a PaaS node 102 or a job identifier may be associated with the job by the job queuing module 300, coordinator module 110, or some other entity. In either case, adding deployment actions to the queue may include making an entry that includes data sufficient to describe the action, such as a script, and the job identifier for the deployment job in which the deployment action was included. The deployment job may also, for each action to be taken, identify an entity, computing device address, virtual machine instance identifier, application instance identifier, or any other information required to identify the device and/or instance that are the target of the action. Accordingly, this information may be extracted from the deployment job and the entry in the queue for a deployment action may include this information as well.

The job queuing module 300 may additionally initialize a counter with a coordinator module 110 for each deployment job. The counter may be initialized to 0 and have a stop or end value equal to the number of deployment actions extracted from the deployment job.

The queue interface module 302 requests deployment actions from the queue for execution. For example, the queue interface module 302 may include a function that makes a request to a queue such as a take( ) or offer( ) method. The method may block until a response is received from the queue. If the queue is empty, then the method will simply block until a deployment action is available. If a deployment action is available, the function receives the entry in the queue for the deployment action and forwards some or all of the information in the entry to the execution module 304 for execution. The execution module 304 performs the actions specified in the received deployment action for the target device and/or instance specified in the deployment action. The execution module 304 may implement some or all of the functionality of a PaaS module as known in the art, including performing actions described hereinabove with respect to any of the resources described hereinabove. Upon successful completion of the deployment action, the updating module 306 reports completion of the action, as will be described in greater detail herein below, such as by interfacing with a coordinator module 110.

Figure 4:
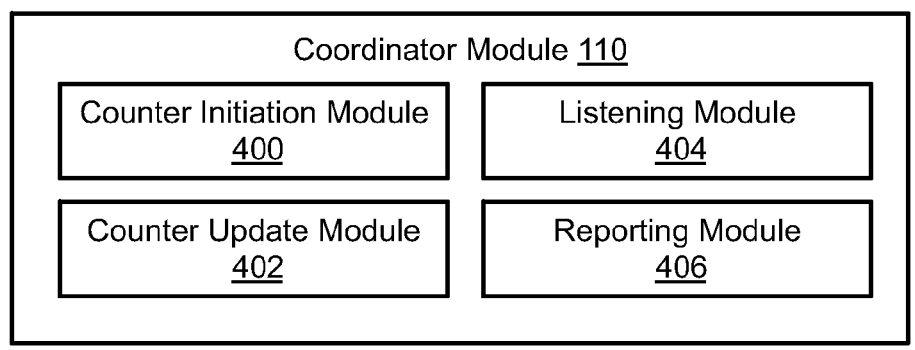
FIG. 4 is a schematic block diagram of a coordinator in accordance with an embodiment of the present invention.

Referring to FIG. 4, the coordinator module 110 may include a counter initiation module 400, a counter update module 402, a listening module 404, and a reporting module 406.

The counter initiation module 400 receives requests from the PaaS nodes 102 to initiate a counter. As noted above the request may include a job identifier. Alternatively, the counter initiation module 400 may assign a job identifier and return this identifier to the calling function for association with the entries for deployment actions in the queue. In either case, the counter initiation module 400 initiates a counter and associated the counter with the job identifier. The request may include an action count indicating the number of actions in the deployment job associated with the counter. This action count may likewise be associated with the counter as a stop value at which the count will be deemed to have completed.

In some embodiments, the counter initiation module may additionally create a locking data structure for the job identifier, such as a semaphore, mutex, or other multi-threaded control data structure. The locking data structure may be subsequently used to avoid error conditions when updating the counter, for example.

The counter update module 402 receives requests to update a counter from the PaaS nodes 102 upon completion of deployment actions. Upon completing a deployment action, the PaaS node may request or otherwise invoke incrementing the counter corresponding to the deployment job that included the action. The counter update module 402 may receive these requests, extract a job identifier included in the request, and update the corresponding counter.

In some embodiments, the counter update module 402 may first receive a request to lock the counter for a job identifier from a PaaS node 102, such as using a locking data structure for the counter, receive a request to update the counter from the PaaS node 102, and then receive a request to release the locking data structure from the PaaS node 102.

In some embodiments, a PaaS node 102 may register a listening function with the coordinator module 110 upon requesting initialization of a counter for a job identifier. The listening function may include a block of code executed upon the occurrence of one or both of updating of the counter and the counter reaching a stop value. Accordingly, the listening module 404 may execute this listening function when the counter corresponding to the same job identifier as the listening function is updated or reaches a stop value.

The reporting module 406 may report one or both of updating of a counter and completion of a job as inferred from a counter reaching a stop value. The reporting module 406 may report completion of a job to one or more of the PaaS node 102 that initiated the counter for the job, a portal 100, or some other entity that submitted the deployment job to the portal 100.

Figure 5:
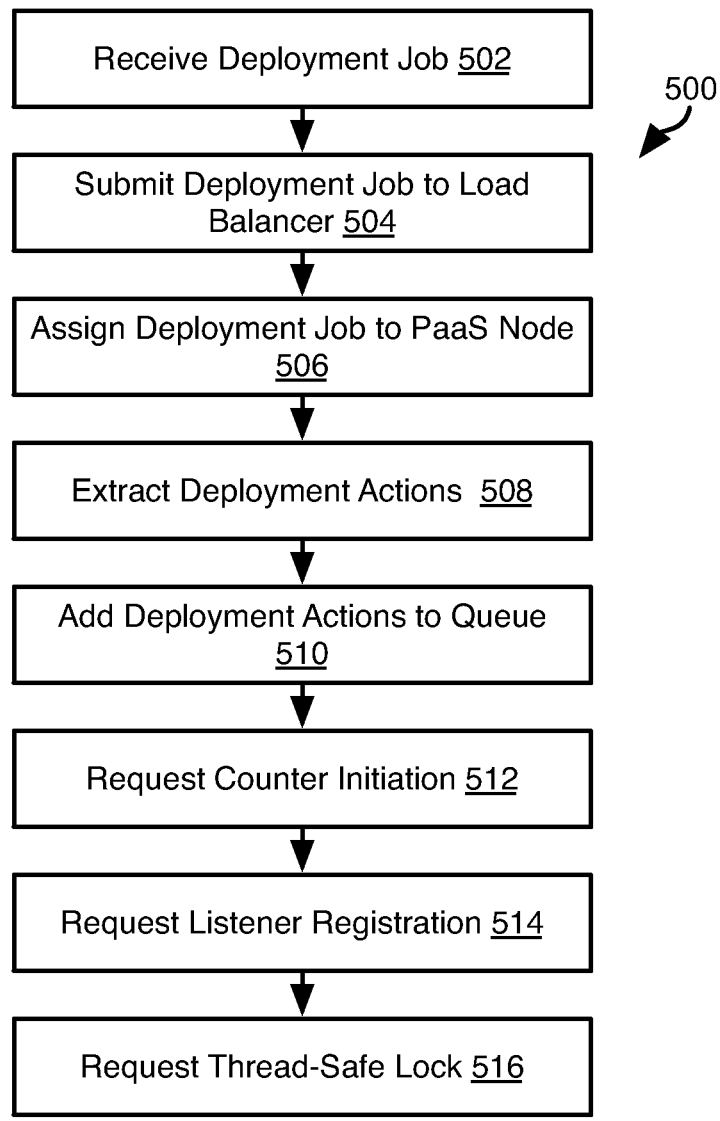
FIG. 5 is a process flow diagram of a method for queuing deployment actions in accordance with an embodiment of the present invention.

FIG. 5 illustrates a method 500 for queuing the deployment actions of a deployment job. The method 500 may include receiving 502 a deployment job including a plurality of deployment actions. The deployment job may be received 502 by means of a user interface from a developer or administrator, by reading a file, receiving transmitted data, or some other means. The received deployment job may be submitted 504 by the receiving entity or device to a load balancer 504 that assigns 506 the job to a PaaS node 102. The method for assigning the job may be any load balancing algorithm known in the art, such as random selection, round-robin assignment, or a more sophisticated algorithm that takes into account actual loading of individual PaaS nodes 102.

Upon receiving the assignment, the receiving PaaS node 102 extracts 508 deployment actions from the job and adds 510 the deployment actions to the queue. The entries added to the queue may include such information as an identifier of the job from which the job was extracted, a description of the action to be taken (e.g. a script or one or more instructions), and a target identifier for a target of the action. The target identifier may reference such information as an address of a target device, an identifier of a target virtual machine, an identifier of a target container, an identifier of a target application instance, or any other information needed to identify a target of the deployment action. The target identifier may identify a class or group of devices and/or instances that are the target of the action. The information included in the queue entry may be extracted from the received deployment job. In some embodiments, the job identifier is included in the deployment job as received. In other embodiments, job identifiers are assigned after receipt. For example, when queuing the job, a job identifier may be assigned by the queue module or other module to the deployment job.

The receiving PaaS node 102 may also interface with the coordinator module 110 in order to request 512 counter initiation for a received job. A request to initiate a counter may include such information as the job identifier for the job and a stop count. Where the counter is initiated to 0, the stop count may equal N−1, where N is the number of actions in a deployment job. In some embodiments, the coordinator module 110 may assign a job identifier upon initiating the counter and return this job identifier to the requesting PaaS node 102.

The receiving PaaS node 102 may also request 514 registration of a listening function. As noted above, a listening function may be a block of code that is associated with the counter and executed upon the occurrence of one or both of updating of the counter and the counter reaching a stop count. The listening function may implement any programmable functionality. In particular, the listening function may invoke reporting of an update to the counter or reaching of a stop count, which may be a result of a different PaaS node than the receiving PaaS node 102, an executing PaaS node 102.

As is described in greater detail below, multiple PaaS nodes 102 may retrieve deployment actions from the queue and execute them. In order to avoid race conditions or lost updates, a thread-safe lock may be associated with a counter. Accordingly, the receiving PaaS node 102 may request 516 instantiating of a thread-safe lock associated with a job identifier. The request may include the job identifier. The thread-safe lock may be implemented as a semaphore, mutex, or other thread-safe data structure.

In some embodiments, a single instruction or request from the receiving PaaS node 102 may invoke all three of initiation of a counter, registering a listener, and requesting a thread safe lock. As noted above, the requests for these actions may be accompanied by a job identifier, or the coordinator module 110 may select a job identifier and return the selected identifier to the requesting PaaS node 102 as well as associate the job identifier with the requested counter, listening function, and thread-safe lock.

In some embodiments, a single object may include as variables and methods thereof the variables and methods implementing all of the counter, listening function, and thread-safe lock. In such embodiments, a handle to this function may be returned to the requesting PaaS node 102. Likewise, a handle to this object may be associated with entries in the queue associated with the deployment job for the object. Executing PaaS nodes may then use this handle to update the counter of the object when executing actions from the deployment job associated with the object.

Figure 6:
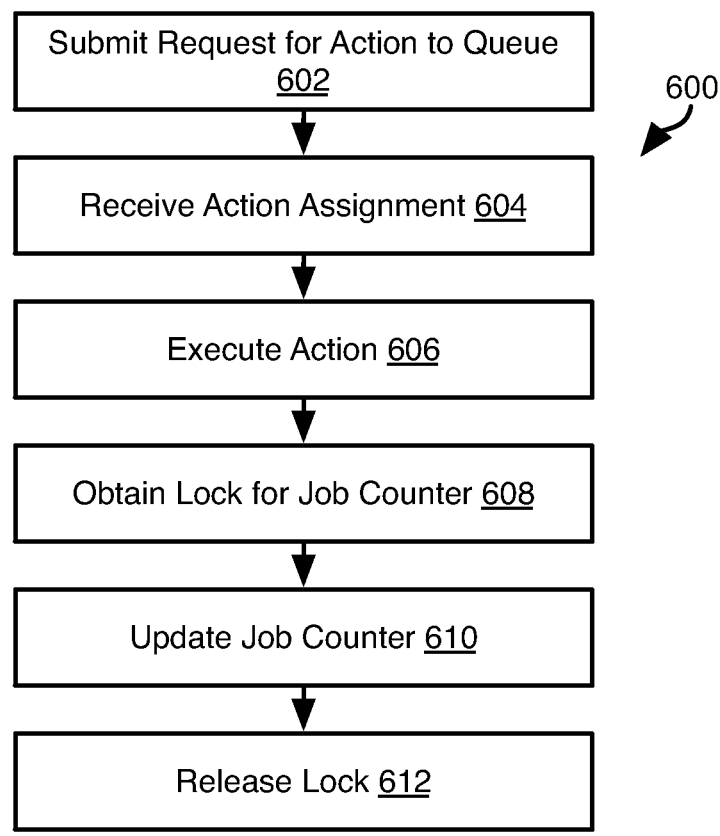
FIG. 6 is a process flow diagram of a method for performing deployment actions by a PaaS node in accordance with an embodiment of the present invention.

FIG. 6 illustrates a method 600 that may be executed by an executing PaaS node 102. As noted above, a receiving PaaS node 102 may also be an executing PaaS node. The method 600 may include submitting 602 a request for a deployment action to the queue module 108. The function that submits the requests 602 may block indefinitely until a deployment action is available from the queue.

The deployment action sent from the queue is received 604 by the executing PaaS node 102. Receiving 604 the deployment action may include receiving some or all of the entry for the deployment action in the queue as described above, including the job identifier for the action, the instruction or instructions to be taken, and a target device and/or instance. The executing PaaS node 102 may then execute 606 the action for the specified target. The action and target may include any of the actions or targets described hereinabove.

The method 600 may then include obtaining 608 a lock for the job counter for the job identifier of the executed action. The executing PaaS node 102 may then invoke updating 610 of the job counter and then release 612 the lock. In some embodiments, order of execution of deployment actions from a deployment job may be important. In such embodiments a lock may be obtained 608 with respect to a job identifier, a deployment action for the job identifier may be executed 606, the counter updated 610, and then the lock released 612. Other PaaS nodes may be prevented from executing deployment actions for the job identifier until the lock is released.

Figure 7:
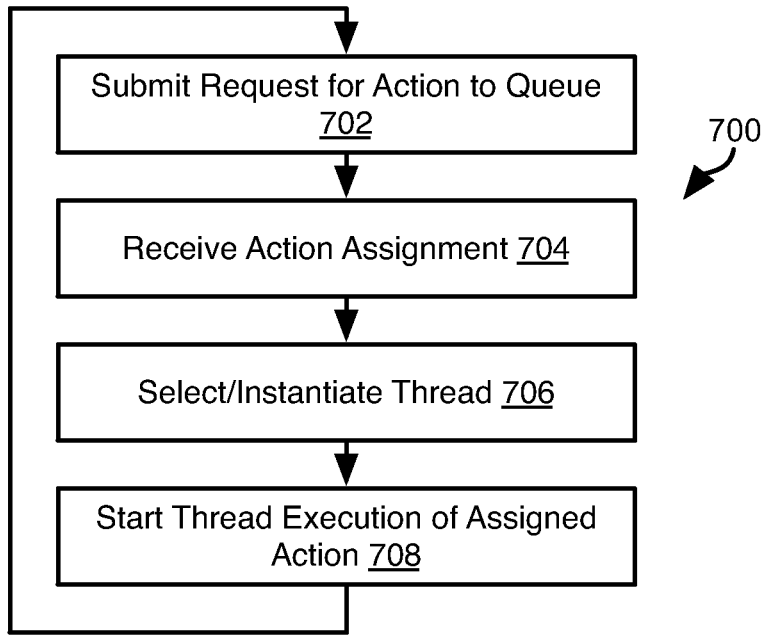
FIG. 7 is a process flow diagram for thread-based processing of deployment actions by a PaaS node in accordance with an embodiment of the present invention.

FIG. 7 illustrates a method 700 that may be executed by an executing PaaS node 102. In particular, a PaaS node 102 may have a principal thread of execution and a flexible pool of worker threads. The method 700 may be executed by the principle thread. The method 700 may include submitting 702 a request for action to the queue and receiving 704 assignment of a deployment action from the queue in the same manner as for the method 600. The principal thread may then select and/or instantiate 706 a worker thread and start 708 the selected thread executing the assigned action. In this manner, the principal thread may continue retrieving deployment actions. Also, the number of worker threads may be expanded up to a maximum number of threads for the PaaS node 102 by adding threads to the thread pool when no thread is available for selection.

Figure 8:
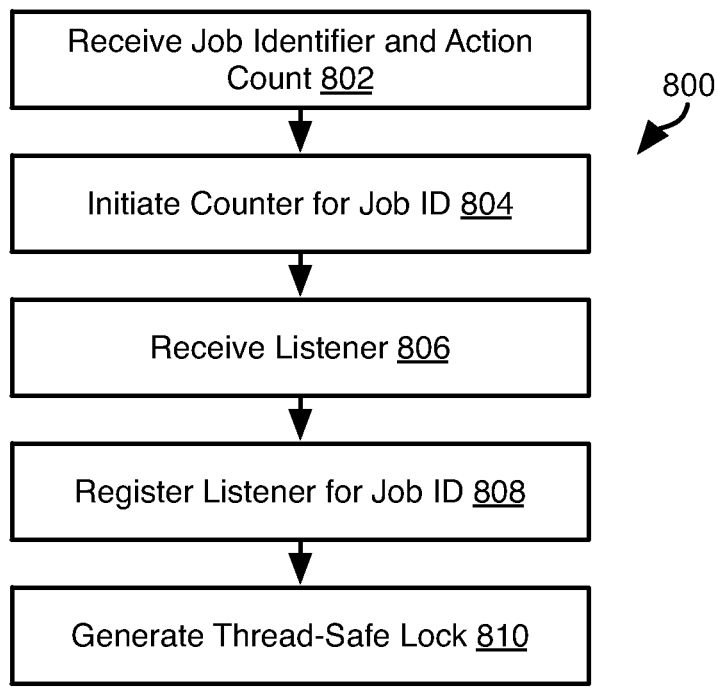
FIG. 8 is a process flow diagram of a method for initiating coordination of a deployment job in accordance with an embodiment of the present invention.

FIG. 8 illustrates a method 800 that may be executed by a coordinator module 110. Various off-the-shelf coordinator modules are available and may be used to perform the method

800. For example, the ZooKeeper™ software package may be used. The method 800 may include receiving a job identifier and action count 802, such as from the queue module 108 or a receiving PaaS 102. As noted above, in some embodiment, the job identifier may be assigned by the coordinator module 110, such that only a action count need be received to start a counter, and the assigned job identifier returned to a requesting receiving PaaS 102. The coordinator module 110 may then initiate 804 a counter for the job identifier. As noted, initiating a counter may include setting the counter value to zero or one and setting a stop value to N or N−1, where N is the action count.

The method 800 may additionally include receiving 806 a listener function from the requesting PaaS node 102 and registering 808 the listener function in associating with the one or both of the job identifier and the job counter. As noted above, the listener function may define an action taken upon the occurrence of one or both updating of the counter and the counter reaching a stop value. The action taken may be to report the updating of the counter or reaching of the stop value to some entity, such as a receiving PaaS node 102, portal 100, or some other entity. A thread-safe lock may also be generated 810 and associated with the job identifier. As noted above the thread-safe lock may be a semaphore, mutex, or other data structure for coordinating multi-threaded functionality. When a counter reaches a stop count, the thread-safe lock, counter, and listener may be removed or otherwise released for use for other deployment jobs.

Figure 9:
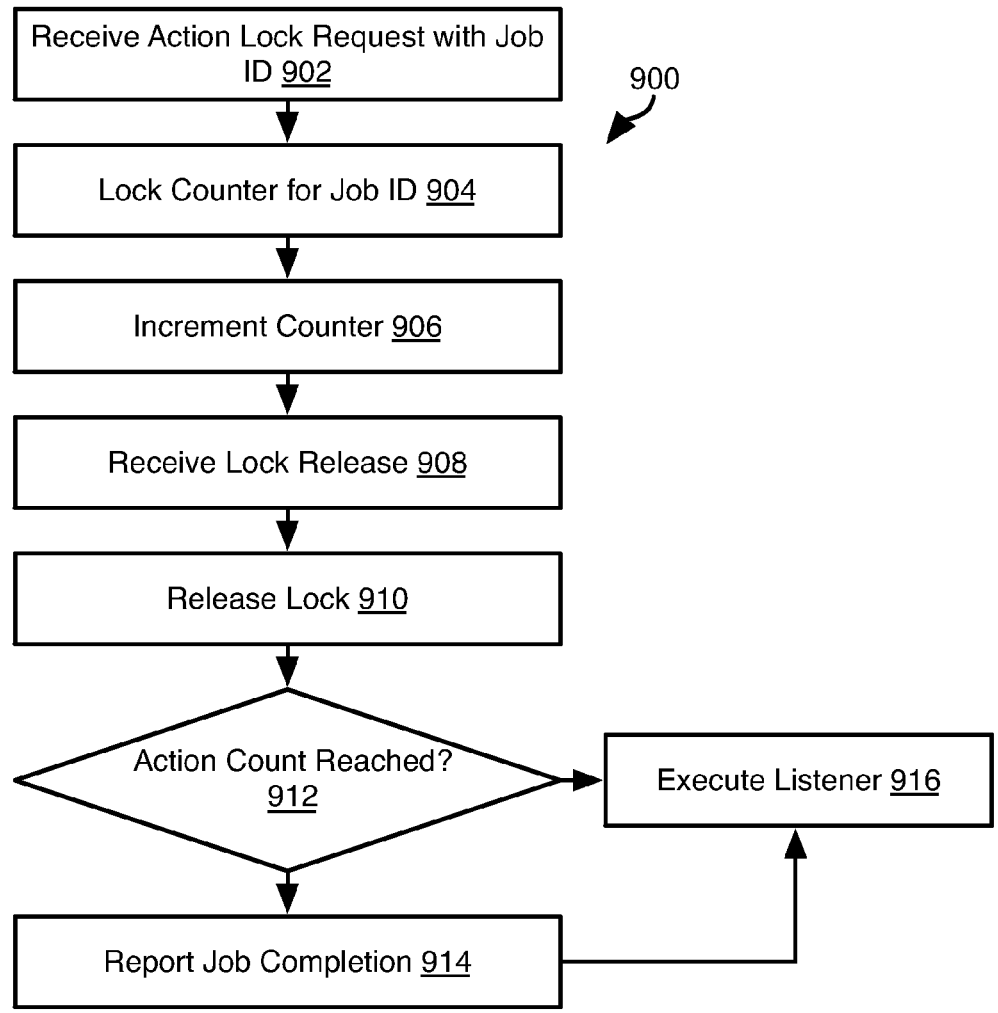
FIG. 9 is a process flow diagram of a method for coordinating execution of a deployment job in accordance with an embodiment of the present invention.

FIG. 9 illustrates a method 900 that may be executed by a coordinator module 110. The method 900 may include receiving 902, from an executing PaaS node 102, a request to lock the thread-safe lock for a job identifier and locking 904 the lock as requested in order to prevent modification of the counter until the lock is released. The job counter corresponding to the received job identifier may be incremented 906. Incrementing may occur automatically upon receiving 902 the request to lock or may be in response to a separate request received from the executing PaaS node 102. The method 900 may further include receiving 906 an instruction from the executing PaaS node 102 and, in response to the instruction, releasing 910 the lock, thereby enabling other executing PaaS nodes 102 to update the counter.

The method 900 may further include evaluating 912 whether the action count for the counter as been reached. If so, then completion of the job may be reported 914. Reporting completion may include communicating this fact to the receiving PaaS node 102 that invoked initiation of the counter. In either case, a listener registered for the counter may be executed 916.

In some embodiments, the step of evaluating 12 the counter with respect to an action account may be performed by the receiving PaaS node 102 that initiated the counter. For example, the listener may be executed 916 regardless of value of the counter in order to report that current value of the counter to an entity, such as the receiving PaaS node 102. The receiving PaaS node 102 may then evaluate 912 the counter value with respect to an action count for the associated deployment job and report 914 job completion to an entity that submitted the deployment job to the receiving PaaS node 102, such as to the portal 100, an interface through which the job was submitted, a log file, or to some other entity.

Figure 10:
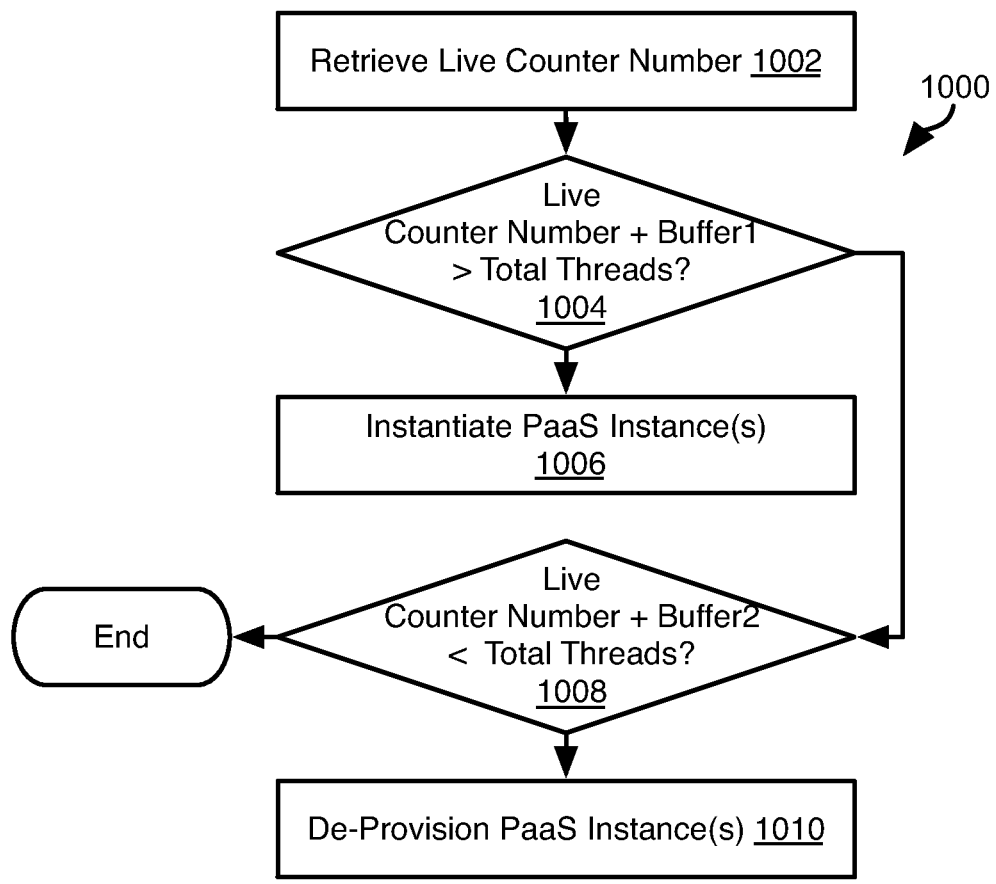
FIG. 10 is a process flow diagram of a method for maintaining PaaS node capacity in accordance with an embodiment of the present invention.

FIG. 10 illustrates a method 1000 that may be executed by a PaaS node 102. In some embodiments, a PaaS node 102 of the plurality of PaaS nodes 102 may be selected as a leader PaaS node 102. This process may be performed as a negotiation among the plurality of PaaS node 102. For example, the PaaS node 102 having loading and computing resources most suitable for performing the functions of a leader node may be selected as the leader PaaS node 102 by the other PaaS node 102. In order to accommodate the decentralized structure of the PaaS nodes 102 prior to selection of a leader node, the process may include an election type process where PaaS nodes 102 evaluate one another and that node that is selected by the majority of the PaaS nodes is designated as the leader node. Each PaaS node 102 may report its attributes and current loading to the other nodes and based on common evaluation criteria, each PaaS node 102 may make a selection. Where a leader node goes offline, then the process may be repeated and another leader node may be selected.

The selected leader node or some other entity may perform the method 1000. The method 1000 may include retrieving 1002 a number of live counters from a coordinator module 110. Live counters may be those that have not yet reached their stop count. The method 1000 may further include evaluating 1004 whether the number of live counters plus a first buffer amount is larger than the total number of threads available for processing deployment tasks according to the methods disclosed herein. The total number of threads may be equal to the maximum number of threads possible per PaaS node 102 multiplied by the current number of PaaS nodes 102.

If the number of live counters plus a buffer value is greater than the first buffer amount above the total available threads, them one or more PaaS nodes 102 may be instantiated 1006. In many applications, a server farm can include a large number of computing devices that can consume a large amount of power. Accordingly, even though hardware may be available, maintaining excess capacity active may be expensive. Accordingly, a node may be instantiated 1006 as needed when deployment actions need to be taken with respect to a large number of installation nodes. This is particularly important since deployments typically occur periodically and a large amount of PaaS deployment capacity is not needed.

Instantiating 1006 a PaaS node may include adding an instruction to instantiate the PaaS node to the queue in the same manner as deployment actions in accordance with the methods described hereinabove. Instantiating 1006 a PaaS node may include taking required actions to allocate, install, instantiate, configure, start, or otherwise prepare for use one or more resources such as a computing device, operating system, virtual machine, container, and one or more PaaS applications and application resources necessary to perform the functionality of a PaaS node 102. The number of PaaS nodes instantiated may be chosen to be sufficient to bring the total number of available threads a first buffer amount larger than the number of live counters.

Where the number of live counters plus the first buffer amount is not greater than the total number of available threads, then the method 1000 may include evaluating 1008 whether the number of live counters plus a second buffer value is less than the total number of available threads. If so, then one or more PaaS nodes 102 may be de-provisioned 1010. The number of PaaS nodes 102 de-provisioned may be sufficient to reduce the total number of available threads to be less than the second buffer amount larger than the number of live counters. The second buffer amount may be smaller than the first buffer amount. In some embodiments, the second buffer amount may be zero. In some embodiments, a minimum number of available threads may be maintained regardless of actual live counter count in order to provide a base level of availability. De-provisioning 1010 may include releasing, stopping, deleting, or otherwise ceasing use of the resources of the de-provisioned PaaS node 102.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for providing platform as a service (PaaS) throughput, the method comprising:
   receiving, by a plurality of PaaS nodes each executing on a computing device, a plurality of deployment jobs, wherein one of the plurality of PaaS nodes is a leader node;
   extracting, by the plurality of PaaS nodes, a plurality of deployment actions from each deployment job of the plurality of deployment jobs, the plurality of deployment actions comprising consuming an application manifest;
   posting, by the plurality of PaaS nodes, the plurality of deployment actions to an action queue;
   creating an action description entry for at least one of the plurality of deployment actions, the action description entry comprising:
      a script description of the at least one of the plurality of deployment actions; and
      a job identifier for each deployment job of the plurality of deployment jobs associated with the at least one of the plurality of deployment actions;
   retrieving, by the plurality of PaaS nodes, individual ones of the plurality of deployment actions from the action queue;
   executing, by the plurality of PaaS nodes, the individual ones of the plurality of deployment actions with respect to a plurality of installation nodes and in accordance with the application manifest, wherein executing the individual ones of the plurality of deployment actions comprises:
      initiating, by the plurality of PaaS nodes, a respective counter in a coordinator module for each deployment job of the plurality of deployment jobs having the job identifier and an action count corresponding to each of the individual ones of the plurality of deployment actions;
      updating, by the plurality of PaaS nodes, upon execution of each of the individual ones of the plurality of deployment actions, the respective counter in the coordinator module for each deployment job of the plurality of deployment jobs; and
      reporting, by the coordinator module, completion of each deployment job of the plurality of deployment jobs upon detection of the respective counter corresponding to each deployment job of the plurality of deployment jobs reaching an action count of the respective counter; and
   while executing each individual one of the plurality of deployment actions, evaluating, by the leader node, a set of counters of the coordinator module, to maintain an amount of PaaS nodes needed by:
      instantiating, by the leader node, additional PaaS nodes when a number of the plurality of PaaS nodes multiplied by a maximum number of threads is less than a threshold amount above a number of the set of counters; and
      de-provisioning, by the leader node, a portion of the plurality of PaaS nodes when the number of the plurality of PaaS nodes multiplied by the maximum number of threads is greater than a second threshold amount above the number of the set of counters.

2. The method of claim 1, wherein:
   each of the plurality of deployment actions includes:
      an application instance identifier; and
      an action with respect to an application instance corresponding to the application instance identifier executing on an application node.

3. The method of claim 2, wherein the application instance identifier identifies the computing device executing the application instance.

4. The method of claim 2, wherein the plurality of deployment actions comprise at least one of:
   upgrade requests;
   start requests;
   stop requests;
   traffic enable requests;
   traffic disable requests;
   provisioning requests;
   installation requests;
   load balancer binding requests;
   database provisioning requests; or
   database edit requests.

5. The method of claim 1, wherein executing, by the plurality of PaaS nodes, the individual ones of the plurality of deployment actions comprises, for each individual one of the plurality of deployment actions:
   selecting a thread;
   starting the thread executing the individual one of the plurality of deployment actions; and
   requesting another individual one of the plurality of deployment actions from the action queue.

6. The method of claim 1, further comprising:
   instantiating, by the leader node, the additional PaaS nodes in accordance with a number of the plurality of deployment jobs received.

7. The method of claim 1, wherein:
   each of the plurality of deployment actions includes:
      an application instance identifier; and
      an action with respect to an application instance corresponding to the application instance identifier executing on an application node;
   the application instance identifier identifies the computing device executing the application instance;
   the plurality of deployment actions comprise at least one of:
      upgrade requests;
      start requests;
      stop requests;
      traffic enable requests;
      traffic disable requests;
      provisioning requests;
      installation requests;
      load balancer binding requests;
      database provisioning requests; or
      database edit requests; and
   executing, by the plurality of PaaS nodes, the individual ones of the plurality of deployment actions comprises, for each individual one of the plurality of deployment actions:
      selecting a thread;
      starting the thread executing the individual one of the plurality of deployment actions; and
      requesting another individual one of the plurality of deployment actions from the action queue.

8. A system for providing platform as a service (PaaS) throughput, the system comprising a plurality of PaaS nodes, wherein one of the plurality of PaaS nodes is a leader node, each of the plurality of PaaS nodes comprising one or more processors and one or more memory devices operably coupled to the one or more processors, the one or more memory devices storing executable and operational data effective to cause the one or more processors of the plurality of PaaS nodes to:
  receive a plurality of deployment jobs;
  extract a plurality of deployment actions from each deployment job of the plurality of deployment jobs, the plurality of deployment actions comprising consuming an application manifest;
  post the plurality of deployment actions to an action queue;
  create an action description entry for at least one of the plurality of deployment actions, the action description entry comprising:
    a script description of the at least one of the plurality of deployment actions; and
    a job identifier for each deployment job of the plurality of deployment jobs associated with the at least one of the plurality of deployment actions;
  retrieve individual ones of the plurality of deployment actions from the action queue; and
  execute the individual ones of the plurality of deployment actions with respect to a plurality of installation nodes and in accordance with the application manifest, wherein the execution of the individual ones of the plurality of deployment actions comprises:
    initiating, by the plurality of PaaS nodes, a respective counter in a coordinator module for each deployment job of the plurality of deployment jobs having the job identifier and an action count corresponding to each of the individual ones of the plurality deployment actions;
    updating, by the plurality of PaaS nodes, upon execution of each of the individual ones of the plurality of deployment actions, the respective counter in the coordinator module for each deployment job of the plurality of deployment jobs; and
    reporting, by the coordinator module, completion of each deployment job of the pluality of deployment jobs upon detection of the respective counter corresponding to each deployment job of the plurality of deployment jobs reaching an action count of the respective counter; and
  evaluate, during the execution of each individual one of the plurality of deployment actions, by the leader node, a set of counters of the coordinator module, to maintain an amount of PaaS nodes needed by:
    instantiating, by the leader node, additional PaaS nodes when a number of the plurality of PaaS nodes multiplied by a maximum number of threads is less than a threshold amount above a number of the set of counters; and
    de-provisioning, by the leader node, a portion of the plurality of PaaS nodes when the number of the plurality of PaaS nodes multiplied by the maximum number of threads is greater than a second threshold amount above the number of the set of counters.

9. The system of claim 8, wherein:
each of the plurality of deployment actions include:
  an application instance identifier; and
  an action with respect to an application instance corresponding to the application instance identifier executing on an application node.

10. The system of claim 9, wherein the application instance identifier identities a computing device executing the application instance.

11. The system of claim 9, wherein the plurality of deployment actions comprise at least one of:
  upgrade requests;
  start requests;
  stop requests;
  traffic enable requests;
  traffic disable requests;
  provisioning requests;
  installation requests;
  load balancer binding requests;
  database provisioning requests; or
  database edit requests.

12. The system of claim 8, wherein the executable and operational data are further effective to cause the one or processors of the PaaS nodes to execute the individual ones of the plurality of deployment actions by, for each individual one of the plurality of deployment action:
  select a thread;
  start the thread executing the individual one of the plurality of deployment actions; and
  request another individual one of the plurality of deployment actions from the action queue.

13. The system of claim 8, wherein the one or more memory devices of the leader node effective to cause the one or more processors of the leader node to instantiate the additional PaaS nodes in accordance with a number of the plurality of deployment jobs received.

14. The system of claim 8, wherein:
each of the plurality of deployment actions includes:
  an application instance identifier; and
  an action with respect to an application instance corresponding to the application instance identifier executing on an application node;
the application instance identifier identifies a computing device executing the application instance;
the plurality of deployment actions comprise at least one of:
  upgrade requests;
  start requests;
  stop requests;
  traffic enable requests;
  traffic disable requests;
  provisioning requests;
  installation requests;
  load balancer binding requests;
  database provisioning requests; or
  database edit requests; and
executing, by the plurality of PaaS nodes, the individual ones of the plurality of deployment actions comprises, for each individual one of the plurality of deployment actions:
  selecting a thread;
  starting the thread executing the individual one of plurality of deployment actions; and
  requesting another individual one of the plurality of deployment actions from the action queue.

* * * * *